United States Patent
Lee et al.

(10) Patent No.: US 7,169,336 B2
(45) Date of Patent: Jan. 30, 2007

(54) PREPARATION OF POWDER GRANULES BY LIQUID CONDENSATION PROCESS AND MANUFACTURE OF POWDER COMPACTS THEREOF

(75) Inventors: Hae-Weon Lee, Seoul (KR); Joo-Sun Kim, Seoul (KR); Jong-Ho Lee, Seoul (KR); Hue-Sup Song, Seoul (KR); Jang-Yong You, Kyunggi-Do (KR); Dong-Seuk Lee, Kyunggi-Do (KR); Jang-Won Heo, Kyunggi-Do (KR); Hyun-Ick Shin, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 295 days.

(21) Appl. No.: 10/383,649

(22) Filed: Mar. 10, 2003

(65) Prior Publication Data
US 2003/0168755 A1   Sep. 11, 2003

(30) Foreign Application Priority Data
Mar. 11, 2002  (KR) .................... 10-2002-0013003

(51) Int. Cl.
*B29B 9/10* (2006.01)
(52) U.S. Cl. .................. 264/13; 264/682; 264/115
(58) Field of Classification Search .............. 264/13, 264/29.3, 115, 682
See application file for complete search history.

(56) References Cited

U.S. PATENT DOCUMENTS 4,526,734 A * 7/1985 Enomoto ................. 264/13

FOREIGN PATENT DOCUMENTS

| DE | 689 19 942 T2 | 7/1995 |
| EP | 0466986 A1 | 10/1990 |
| EP | 0 356 240 B1 | 12/1994 |

OTHER PUBLICATIONS

German Search Report, Oct. 10, 2003.
German Office Action directed to corresponding foreign application mailed Aug. 4, 2005.

* cited by examiner

*Primary Examiner*—Mary Lynn Theisen
(74) *Attorney, Agent, or Firm*—Morrison & Foerster LLP

(57) ABSTRACT

A method for preparing powder granules by a liquid condensation process comprising preparing a slurry by mixing powders, a binding agent and a binding agent soluble solvent, dropping the slurry to a binding agent insoluble solvent to fix the binding agent so that the binding agent can not be released to a surface of a droplet of the slurry, coagulating the droplet by solvent exchange between the soluble solvent inside the droplet and the insoluble solvent at the surface of the droplets, and separating the coagulated droplet from the insoluble solvent, drying it and completely removing a residual solvent.

7 Claims, 5 Drawing Sheets

PREPARATION OF POWDER GRANULES BY LIQUID CONDENSATION PROCESS AND MANUFACTURE OF POWDER COMPACTS THEREOF

BACKGROUND OF THE INVENTION

1. Field of the Invention

The present invention relates to preparation of powder granules by liquid condensation process and its manufacture of powder compacts.

2. Description of the Background Art

For a shaping of powders, a manufacture method should be properly selected according to the geometrical shape and size of a body to be shaped. A manufacturing method should be selected in consideration of the shape and size of a body to be shaped, and its adoption as a shaping method could be is substantially limited by the size, shape and their distributions of starting powders.

In a conventional art, a thermal spray drying method has been used to form free-flowing granules by artificially coagulating primary particles in the presence of organic additives. The thermal spray drying method is performed by spraying suspension droplets, containing starting powders, organic additives, and liquid medium, into hot air stream to obtain coagulated powder mass called granule consisting of primary particles and organic additives by removing liquid vehicle. In this process, since liquid vehicle is evaporated at the surface of suspension droplets, the liquid vehicle inside the suspension droplets should be moved to the surface through capillary pores formed between the primary particles.

If solid particles in suspension droplets have large differences in their sizes, fine particles are likely to move together with liquid vehicle through capillary pores formed between coarse particles (capillary migration) and to segregate at the surface of the dried granules. Likewise, organic additives also tend to migrate with liquid vehicle and to be concentrated at the surface similar to the fine particles.

Generally, compaction characteristics of granules are dependent on the packing structure of primary particles and the properties of organic additives, but the separation/segregation of component particles and organic additives by the capillary migration leads to macro-defect in dried granules and final shaped body.

The surface segregation of the organic additives and fine component particles provides a main reason to cause drying defects such as surface crust formation and hollow granules, which originates from rapid capillary migration at the initial stage of drying.

The aforementioned defects have great influences on the drying shrinkage of the suspension droplets during drying and on the packing density and strength of dried granules.

In fact, such defects of granules caused in the thermal spray drying have significant influences on the compaction and sintering behaviors of a dry-pressed body and also on the properties of the shaped and final sintered bodies. Especially, when the component particles in a composite system have large differences in density and size, or when the starting powder has a broad particle size distribution, the spray drying can readily result in various drying defects in dried granules. Thus, the uniformity of granules itself plays a critical role in determining the packing uniformity and structure of a shaped body.

The uniform granules can be obtained by eliminating or minimizing the separation of component particles and/or organic additives during removing liquid vehicle.

The microstructure of a shaped body and the property of a sintered body are determined by the uniformity and the physical property of the granules. The granules manufactured by the conventional thermal spray drying process can not avoid surface segregation of constituting substances and fine particles, morphological defects such as hollowness therein and variation of granule properties with granule size distribution.

One of effective methods to solve such shortcomings of the thermal spray drying is a freeze drying method, although it has a low productivity and is limited to aqueous suspension.

SUMMARY OF THE INVENTION

Therefore, an object of the present invention is to provide a method for manufacturing economically uniform granules without a defect.

Another object of the present invention is to change freely a packing density of granules so as to control the structure and properties of a shaped body.

Still another object of the present invention is to improve forming capability of composite granules composed of starting powders with significant physical characteristics.

To achieve the above objects of the present invention, there is provided a method for preparing powder granules by a liquid condensation process, comprising: preparing a slurry by mixing powders, a binding agent and a binding agent soluble solvent; dropping the slurry to a binding agent insoluble solvent to fix the binding agent so that the binding agent can not be released to a surface of a droplet of the slurry, coagulating the droplet by solvent exchange between the soluble solvent inside the droplet and the insoluble solvent at the surface of the droplets; and separating the coagulated droplet from the insoluble solvent, drying it and completely removing a residual solvent.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate examples of the invention and together with the description to explain the principles of the invention.

In the drawings.

DETAILED DESCRIPTION OF THE PREFERRED EXAMPLES

Figure 1:
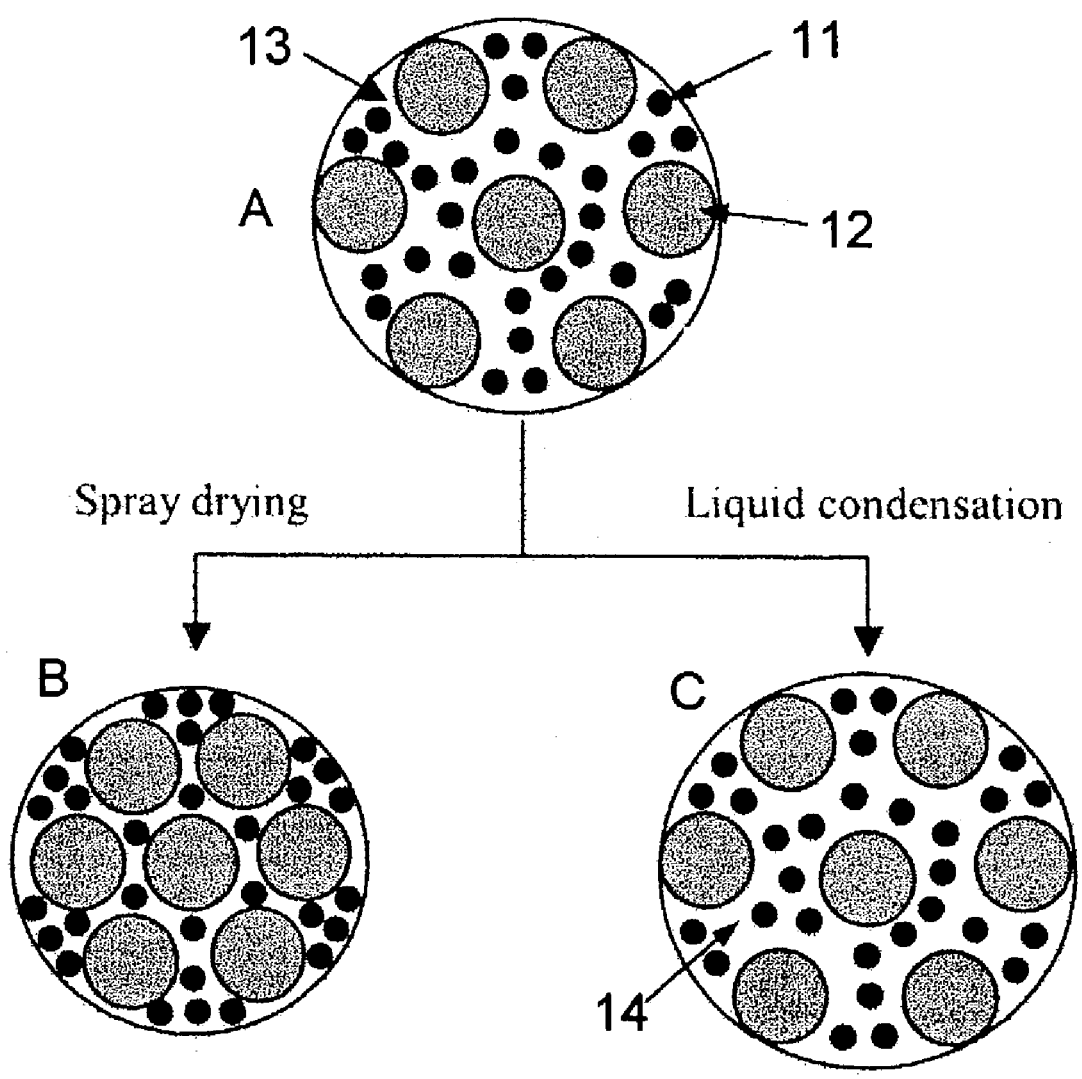
FIG. 1 is a schematic view showing the compaction structure of granules manufactured by a thermal spray drying method and a liquid condensation process.

Reference will now be made in detail to the preferred examples of the present invention, examples of which are illustrated in the accompanying drawings.

According to a liquid condensation method of the present invention, droplets of slurry are dropped into an insoluble solvent with low or little solubility of a binding agent to form granules having a certain shape and compaction structure, and the solvent is removed from the granules without any contraction, so as to manufacture granules having the same particle dispersion structure as the slurry.

In comparison with the conventional thermal spray drying process, the liquid condensation, method does not cause morphologiacal defects in shaped bodies since there is no contraction in granules. In addition, since the compaction structure of granules is mainly determined by the dispersion structure in slurry, it is easy to control the process for manufacturing granules.

By the liquid condensation method, the compaction behavior of granules can be easily controlled and the packing structure of particles in the shaped body can be made uniform, regardless of the physical characteristics of the component powders, such as a composite material consisting of primary particles with different size and density, powders with a wide particle size distribution, fine particles having a likelihood of drying defect, or powders with a geometric anisotropy.

In detail, in the present invention, powders, a binding agent and a solvent soluble in the binding agent (soluble solvent) are mixed to prepare slurry. Then, the slurry is dropped to a solvent insoluble in the binding agent (insoluble solvent) so as to prevent the binding agent from coming out of droplets of the slurry. The droplets are coagulated by substitution between the soluble solvent inside the droplets and the insoluble solvent at the surface of the droplets. Next, the coagulated droplets are separated from the insoluble solvent and dried so that a residual solvent is completely removed.

The slurry may further include a dispersion agent or a plasticizer. A thermosetting resin, a thermoplastic resin or their mixture is used as the binding agent.

The powders in the slurry are suitably in the range of 0.1–35 vol % of the slurry in consideration of the properties of the shaped body. When powders are fibrous or platy geometric anisotropic or when a very thin body is to be manufactured, a volume fraction of powders in the slurry should be preferably reduced as much as possible.

In addition, the present invention also provides a method for shaping powder granules by a liquid condensation method.

In the method, slurry is prepared by mixing powders to be shaped and a binding agent and dispersing the mixture in a solvent soluble in the binding agent. Next, the slurry is dropped into a solvent insoluble in the binding agent so as to prevent the binding agent from coming out of droplets of the slurry. Then the droplets are coagulated by substitution between the soluble solvent inside the droplets and the insoluble solvent at the surface of the droplets. Next, the coagulated droplets are separated from the insoluble solvent and dried so that a residual solvent is completely removed to prepare dried granules. The granules are pressed in a mold to shape a body. Then, the body is heated to remove the binding agent.

In the thermal spray drying method or in the freeze drying method, in order to shape a composite material containing mixed powders with different sizes and densities, nano-sized powders or powders with the geometric anisotropy, the steps from preparation of slurry to forming granules should be very precisely controlled.

However, in the present invention, since the capillary migration of the component particles or substances is restrained, it is possible to manufacture granules with the same spacing between particles as in the slurry. This is not only because the compaction structure of granules is easily controlled by varying the dispersion structure of the slurry, but also because as the solubility of the binding agent is instantaneously degraded due to the insoluble solvent infiltrating into the droplets, the capillary migration of the binding agent to the surface of the droplets is minimized.

Once the binding agent is fixed under the insoluble solvent, while the volume of the droplet is constantly maintained, the liquid medium of the droplet is removed without causing a change to the volume, and thus, granules without drying contraction can be prepared.

FIG. 1 is a schematic view showing compaction structures manufactured by the thermal spray drying method and the liquid condensation process.

The 'A' represents a droplet of slurry in which the fine particles 11 and coarse particles 12 are mixed in the solvent 13. When the droplet 'A' is processed under the thermal spray drying method, it is dried and contracted like a granule 'B', and in this process, the component substances and particles are inevitably separated due to capillary migration.

Comparatively, when the droplet 'A' undergoes the liquid condensation process, since there is no rapid drying and contraction of the droplet, the component substances and particles maintain just the same as the initial droplet, like a granule 'C'. Reference numeral 14 denotes pores in the granule.

Thus, the liquid condensation process according to the present invention is advantageous in that the packing density of particles, which has much influence on the mechanical characteristics and compaction characteristics of the granule, can be controlled, with maintaining uniform distribution of the binding agent and the component particles. That is, varying the ratio of the solid phase in slurry leads to control the compaction structure of the granule, and additionally, controlling the composition and content of the binding agent can change the compaction behavior of the granule.

In the dry-pressed process consisting of three steps of die filling, compaction and ejection, a main reason for defect of shaped body differs depending on a geometric form of the body. For example, as for a thin body, uniformity of a die-fill density of the granules in a mold is most important, but as the thickness of a body is increased, it is critical to restrain defects caused by expansion occurred when an elastic energy generated in the compaction step is changed into an elastic strain in the ejection step.

A micro-structural defect in a granule, as well as a macro defect related to the die filling or ejection of the granule, leads to a defect of a shaped body, which is hardly removed even in a sintering process.

In the liquid condensation process according to the present invention, the characteristics of granules required for the dry-pressed process can be easily controlled and the uniform compaction structure and distribution of the component particles and the binding agent in granules is obtained. Thus, a shaped body having uniform compaction structure of primary particles without a macro defect can be manufactured.

Granule Preparation and Shaping

A granule preparation method and manufacture method will now be described in detail.

In a preparation of slurry, powders are mixed with a solvent in which a binding agent is easily dissolved, and dispersed in the solvent without cohesion of primary particles by ultrasonic treatment or milling. Next, a binding agent is added to the slurry and is completely dissolved.

In this respect, in order to improve the dispersability of the component particles, a dispersion agent can be added to the slurry. If the dispersion agent is not likely dissolved in the solvent where the binding agent is dissolved, a mixed solvent including another solvent where the dispersion agent can be easily dissolvable may be used.

Next, the slurry are dropped to a binding agent insoluble solvent which can be mixed with the solvent in the slurry but with little insolubility for the binding agent. The binding agent in droplets of the slurry is fixed during a solvent exchange of the soluble solvent and insoluble solvent.

Since the soluble solvent is removed from the droplets and the insoluble solvent is infiltrated into the droplet through mutual diffusion, the insoluble solvent is preferable to maintain a high temperature under its melting point in order to accelerate coagulation of the droplets. In addition, it is preferable to agitate the insoluble solvent so that a large concentration gradient between the inside and the outside of the droplets can be maintained.

Once the droplets are coagulated, to remove a solvent remaining in the droplets, the droplets are maintained for a predetermined time with being agitated strongly in the insoluble solvent. And then, after the coagulated droplets are come down by gravity, the solvent is removed. Alternatively, the droplets are separated from the solvent through a filter.

The solvent may still remain in the capillaries of the droplets. Thus, next to the separation, the remaining solvent is dried to be removed from the droplets. When the remaining solvent is completely removed, granules are obtained by the liquid condensation process in accordance with the present invention.

To shape a body with a desired shape and compaction structure, the dried granules are to be filled in a mold and to be pressed at a predetermined temperature and for certain time. After finishing the shaping, the shaped body is gradually heated in a furnace, so that a gas pressure may not be accumulated during thermal decomposition of the binding agent.

As the binding agent, a thermoplastic binding agent and a thermosetting binding agent may be mixedly used depending on the size of shape of the parts. In this respect, a two-step for removing is preferable in which a continuous gas channel is formed in the body by removing the thermoplastic binding agent by through capillary migration at the initial stage and then thermal decomposition of the thermosetting binding agent is accelerated through the channel.

In case that carbon remains intentionally in the shaped body so as to be used as a component material of a sintered body, the amount of the residual carbon can be maximized by a post thermal treatment in a vacuum or inert atmosphere after removing the thermoplastic binding agent.

As the removing is completed, only powders without the binding agent remain in the shaped body, which is then sintered or reactively sintered at a high temperature to obtain a fine and densified sintered body.

Controlling of Compaction Density of Granules

In order to control forming capability of granules, it is preferred to control the compaction density of the primary particle of the granule or composition of the binding agent. Compaction density of granules is controlled by changing the volume fraction of the powders in slurry.

Meanwhile, the shaping of the composite material containing fibrous or platy dispersed particles has the following problems.

First, since the attraction between dispersed particles (dispersed phase) with geometric anisotropy is greater than that of fine powders (matrix phase), the composite material is hardly dispersed in slurry. Further, the compaction characteristics are deteriorated due to contact between the dispersed particles with a relatively large size even in the shaping. Geometric anisotropy particles cause various defects in preparing granules.

Figure 2:
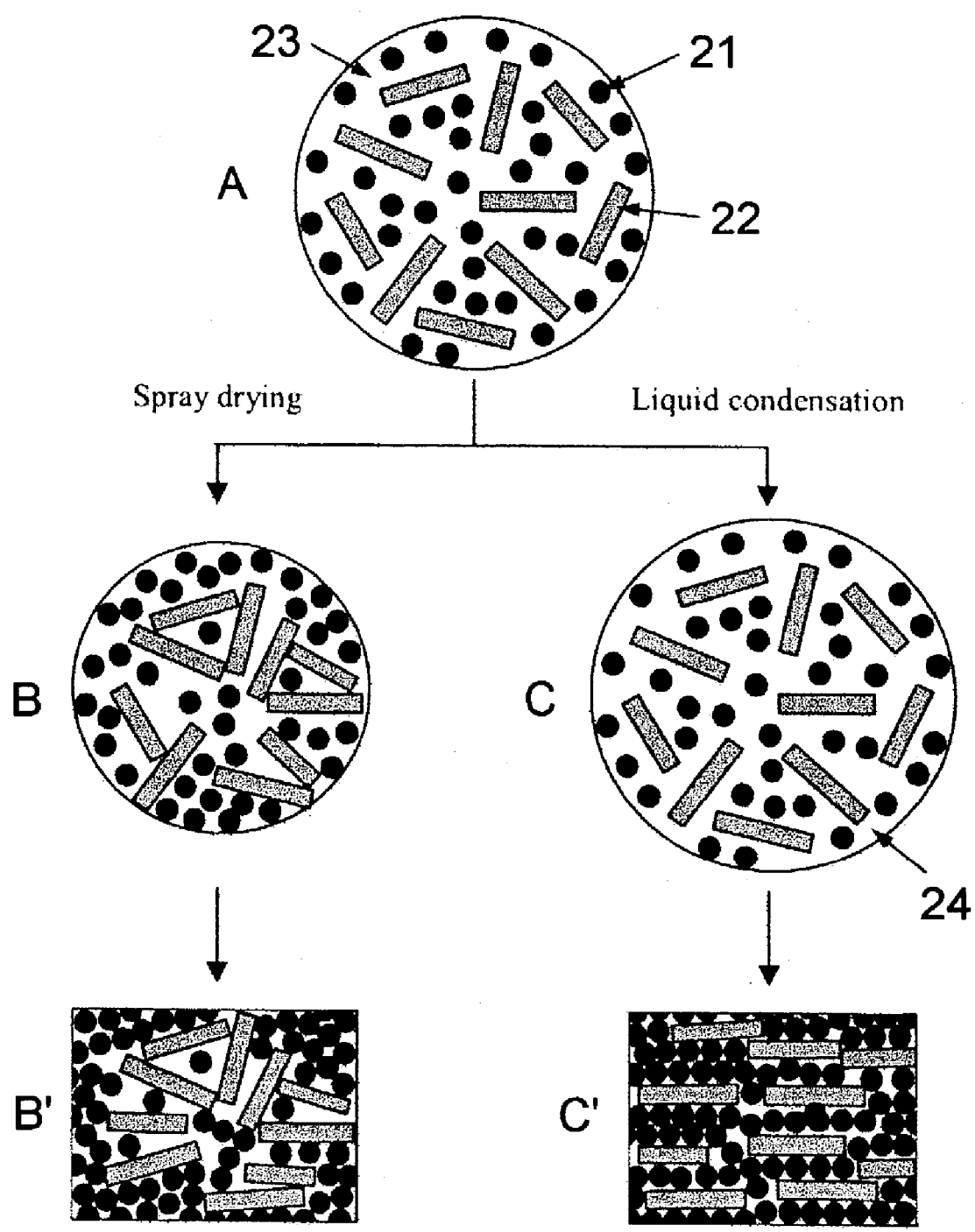
FIG. 2 is schematic view showing the compaction structure of granules manufactured by the thermal spray drying method and the liquid condensation process for powders with geometric anisotropy particles.

FIG. 2 is schematic view showing compaction structures of granules having geometric anisotropic particles prepared by the thermal spray drying method and the liquid condensation process.

The droplet 'A' of slurry includes a fine particle 21 and a fibrous phase 22 in a solvent 23.

When the thermal spray drying is performed, the distance between fibrous phases, the geometric anisotropic particles, is shortened due to the capillary migration and the dry contraction of the liquid medium (solvent) like 'B', and if worse, the anisotropic particles are in contact with each other. Such shortened distance and contact between the anisotropic particles increase a resistance against applied pressure in shaping step, causing a compaction defect like the shaped body 'B".

On the other hand, low density granules prepared by the liquid phase condensation process, granule 'C' is just the same as the initial structure of the droplet 'A'. Since the fraction of particles in granule is low, the initial contact between anisotropic particles can be prevented.

As a result, the orientation of the anisotropic particles can be maintained and the compaction density can be improved like the shaped body 'C". Reference numeral 24 denotes pores in the granule.

Various examples of the present invention will now be described with reference to the accompanying drawings.

EXAMPLE 1

Preparation of Samples with Diverse Compaction Ratios Through Variation of Density of Powders in Granule Titanium oxide powders with a particle size of 20–30 nano meter were dispersed in an ethyl alcohol, to which 1–8 wt % of phenol resin as a binding agent and 0.5–8 wt % of DBP (Di-butyl phthalate) were added to prepare a slurry.

In preparing the slurry, it is preferred to perform a milling or ultrasonic treatment in order to reduce a size of agglomerated powder and accelerate dispersion and mixing.

The prepared slurry was dropped into distilled water heated at a temperature of about 50–80° C., solvent exchange took place rapidly and droplets of the slurry were solidified as it is.

After residual solvent (ethyl alcohol) in the droplet granule was minimized through continuous agitation, the dropped granule was separated from the solution (the distilled water) and dried, whereby granules was prepared by the liquid condensation process.

A pressure of 5–400 MPa was applied to the granules in a mold at a room temperature –120° C., thereby fabricating a test sample.

A compaction ratio is defined as a value dividing the height of a mold with granules filled therein by the height of a shaped body. When a very thin sample is fabricated by uniaxial pressurization shaping, a key point in fabricating a uniform shaped body is to fill the granules in the mold uniformly. Therefore, in order to fabricate a very thin sample, the granules should be filled uniformly in a mold by increasing the compaction ratio while the granules should be easily deformed and broken. In order to increase the uniformity of mold filling density, the powder compaction density of granules needs to be lowered down.

In the liquid condensation process of the present invention, the granules can be prepared while the powder-dispersed state of the slurry is maintained as it is. Therefore, the volume fraction of sold phase in the slurry determines the compaction density of the powders in the granule.

That is, the greater the volume fraction of powders in the slurry, the greater the compaction density of the granule formed by the liquid condensation. For example, in order to fabricate a sample with a thickness of below 1 mm, the content of powders in the slurry is preferably 1–5 vol % to prepare the granules.

Table 1 shows comparison of results that granules prepared through the liquid condensation method from a slurry of which titanium oxide powders with the nano size has a volume fraction of 10 vol % (LC-1) and from a slurry of which titanium oxide powders with the nano size has a volume fraction of 2 volume % (LC-2) were shaped with the pressure of 80 MPa at a temperature of 120° C. Regardless of the L/D ratio, the ratio of the height of the test sample to the diameter of the test sample, the shaping density of the test sample prepared by the LC-2 granules has all the high values compared with the test sample prepared by the LC-1 granules, and especially, the thin test sample, that is, the test sample with the low L/D ratio shows the big difference.

TABLE 1

Influence of powder compaction density of granules made on thickness of test samples.

| type | L/D ratio | Thickness of test sample | shaping density |
|------|-----------|--------------------------|-----------------|
| LC-1 | 0.069 | 0.88 | 48.9 |
|      | 0.122 | 1.43 | 53.5 |
|      | 0.163 | 2.08 | 54.1 |
|      | 0.214 | 2.73 | 54.6 |
|      | 0.318 | 4.06 | 53.4 |
| LC-2 | 0.050 | 0.71 | 55.4 |
|      | 0.108 | 1.38 | 56.1 |
|      | 0.158 | 2.02 | 54.7 |
|      | 0.212 | 2.71 | 54.8 |
|      | 0.328 | 4.19 | 53.8 |

Table 1 shows the result obtained from ultra-fine powders with the particle diameter of 20–30 nm, almost the same behavior can be obtained from other powders. The shaped body having the thickness of below 1 mm can hardly be obtained from the thermal spray dry granules, but a test sample can be easily fabricated in case of using the liquid condensation granules of the present invention.

EXAMPLE 2

Shaping of a Composite Material Having a Dispersion Phase with a Geometric Anisotropy In order to prepare a composite material containing 30 vol % of $Al_2O_3$—$SiO_2$ fibrous phase and 70 vol % of glass powders, low density granules were prepared from a slurry in which the volume fraction of solid phase (powders) was 2 vol %.

1–8 wt % phenol resin, 1–8 wt % of PVB (polyvinyl butyral) and 1–8 wt % of DBP (Di-Butyl Phthalate) were dissolved as binding agents in a solvent where isopropyl alcohol and toluen are mixed by 6:4 ratio, to which component powders were added.

The slurry was subjected to strong agitation, or milling or ultrasonic treatment, to uniformly mix the powders and separate agglomerated powders.

The prepared slurry was dropped to distilled water heated up to about 50–80° C. As the rapid solvent exchange occurred, the droplets of the slurry were solidified to granules as it is as in the state of having been dropped.

Residual solvent in the granule was minimized through continuous agitation, and the granules were separated from the solution (the distilled water) and-dried, thereby fabricating granules through the solution condensation process.

The thusly prepared low density granules were filled in the mold and pressed by 5–400 MPa at a temperature of 120° C., to fabricate a sample.

The shaped sample was compacted up to the level of 61% of the theoretical density, almost the same as the sample (Example 1) without containing the geometric anisotropy particles.

Figure 3:
FIG. 3 is a cross-sectional view showing the fracture surface of a shaped body obtained by the liquid condensation process using a composite material containing fibrous particles.

FIG. 3 shows a fracture surface of a compressed and shaped sample. In FIG. 3, fibrous particles with a length of 500–1000 μm are mostly arranged two-dimensionally, and are considerably uniformly distributed.

When the granules are prepared with powders containing the geometric anisotropy particles, it is preferred to maintain the granule at a low density, for which the content of powders in the slurry is adjusted to 0.5–4 vol %.

EXAMPLE 3

Shaping of a Composite Material in which the Component Powders are Different in Particle Diameters If the difference in the particle diameters of powder particles in slurry is great, there is a high probability that the component particles are separated. For example, when granules are prepared by mixing powders with a size of a few μm and fine particles with a size of a few nm, the capillary migration of the fine particles and the surface segregation occurring in drying process can cause a shape defect, as well as influence on the compaction density of the shaped body.

In such a case, preparation of granules by using the liquid condensation method exhibits a uniform mixture and compaction structure, compared with those fabricated by the thermal spray drying method which accompanies the capillary migration and drying contraction of the fluid.

In this example, silicon carbide-carbon black composite material shaped body was fabricated by using 0–30 vol % of component powders (silicon carbide of a size of a few μm and carbon black with a size of 10–30 nm) and a phenol resin as a binding agent.

As the phenol resin remains residual carbon during the removing step after being used as the binding agent, it also works as an additional carbon source.

1–8 wt % of phenol resin and 1–8 wt % DBP were dissolved in a solvent in which ethyl alcohol and acetone were mixed by 2:8 ratio, to which component powders were added, thereby preparing a slurry.

For a uniform mixture and separation of agglomerated particles, the slurry was subjected to a strong agitation, milling or the ultrasonic treatment. In this case, in order to improve the dispersability of the carbon black, a dispersion agent can be used.

The thusly prepared slurry was dropped to distilled water heated at a temperature of about 50–80° C. As a rapid solvent exchange took place, the dropped slurry turned to solid as it is.

Residual solvent in the granule was minimized through continuous agitation, and the dropped granule was separated from the solution and dried, thereby fabricating granules through the liquid condensation process.

The thusly prepared granules were pressed by 5–400 MPa at a room temperature ~120° C., to fabricate a sample.

Table 2 shows a comparison of a shaping density of silicon carbide-carbon black composite material according to increase in the content of the carbon black under the condition of addition of a constant phenol resin. It is noted that the sintering density of the carbon black mixed composite material shows more improved sintering density than that of silicon carbide solely. Thus result proves that the a shaped body without a defect can be fabricated with the granules of the present invention, and resultantly, the sintering characteristics can be improved.

Figure 4:
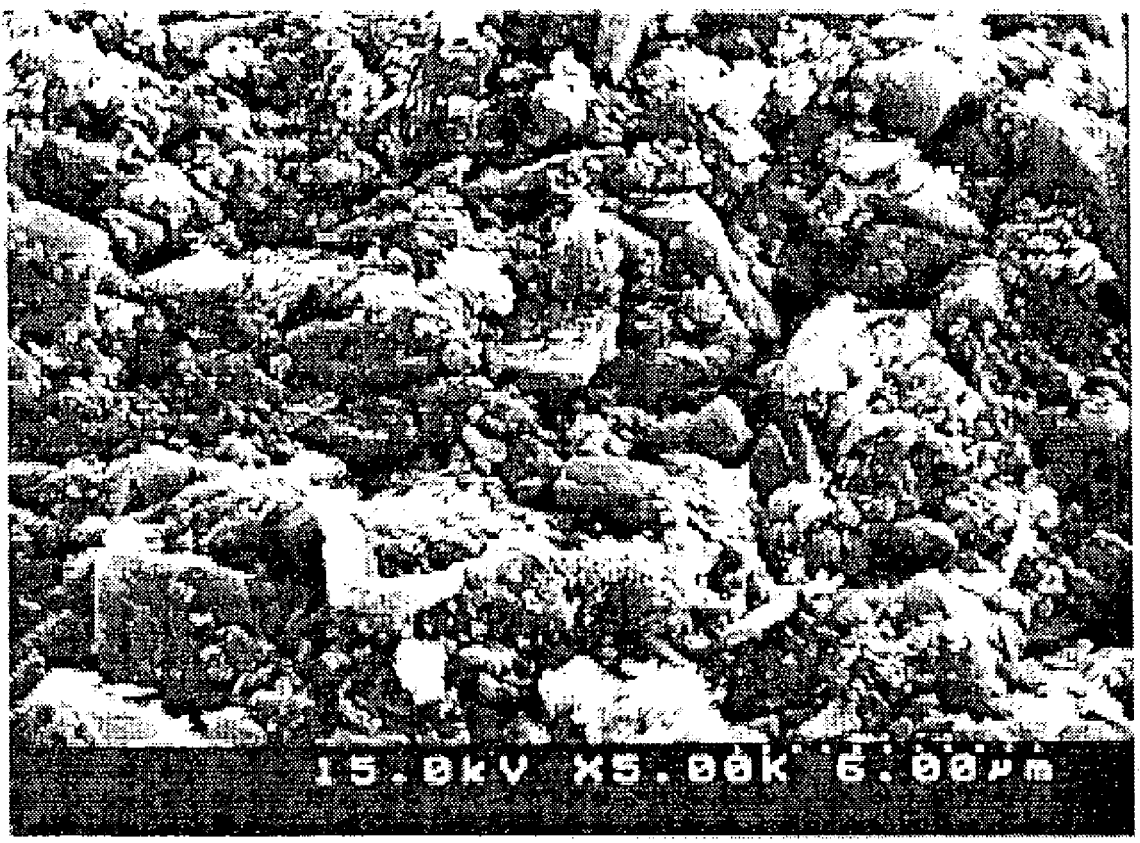
FIG. 4 is a cross-sectional view showing the fracture surface of a shaped body obtained by the liquid condensation process using silicon carbide and carbon black.

FIG. 4 shows a fine structure of a composite material containing the 30 volume % of carbon black, in which the uniform compaction and distribution of silicon carbide and carbon black powder particles can be observed.

TABLE 2

Shaping and sintering density of silicon carbide-carbon black composite material

| Powder composition (vol %) | | | |
|---|---|---|---|
| Silicon carbide | Carbon black | Shaping density (%) | Shaping density (%) |
| 100 | 0 | 53.9 | 96.7 |
| 91.6 | 8.4 | 57.0 | 97.0 |
| 83.8 | 16.2 | 58.2 | 97.4 |
| 76.6 | 23.4 | 60.3 | 97.5 |
| 69.7 | 30.3 | 62.8 | 97.8 |

EXAMPLE 4

Preparation of a Laminated Body by Liquid Condensed Granules

A laminated body of ceramics is generally obtained by forming ceramic sheets through a tape casting, laminating them and applying a pressure thereto with heat treatment.

Typically, composition of a binding agent for the tape casting consists of a binding agent, a plasticizer and a dispersion agent. If a large amount of organic additive is contained, flawless uniform granules can be prepared through the general preparation method.

According to the liquid condensation method of the present invention, quite uniform granules can be prepared regardless of shape and size distribution of the constituent powders, with which a shaped body can be prepared with a uniform compaction structure.

In this example, alumina was used as the constituent powders, phenol resin (KNG-100, Kolon), PVB (Butavar B-79, Monsanto, USA) was used as a binding agent, a DBP (Yahuri, Japan) was used as a plasticizer, and a KD-1 (Uniquema, UK) was used as a dispersion agent.

As a solvent, a mixture solvent in which toluen: isopropyl alcohol=40:60 was used that can dissolve every organic additive.

The organic additive used in this example had a composition that 1 wt % of the dispersion agent, 7% of PVB, 7% of DBP and 4% of phenol resin on the basis of weight of alumina.

After fabricating a slurry containing powders and the organic additive, it was dropped to distilled water heated up to 50–80° C. likewise in Example 1, to prepare solution condensed granules. The liquid condensed granules is compressed with a pressure of 10–100 MPa at a temperature of 60–90° C. for 3–20 minutes to shape a tape of 5 cm×5 cm. Two tapes are overlapped and compressed with a pressure of 10–100 MPa at a temperature of 60–100° C., thereby forming a laminated body.

Figure 5:
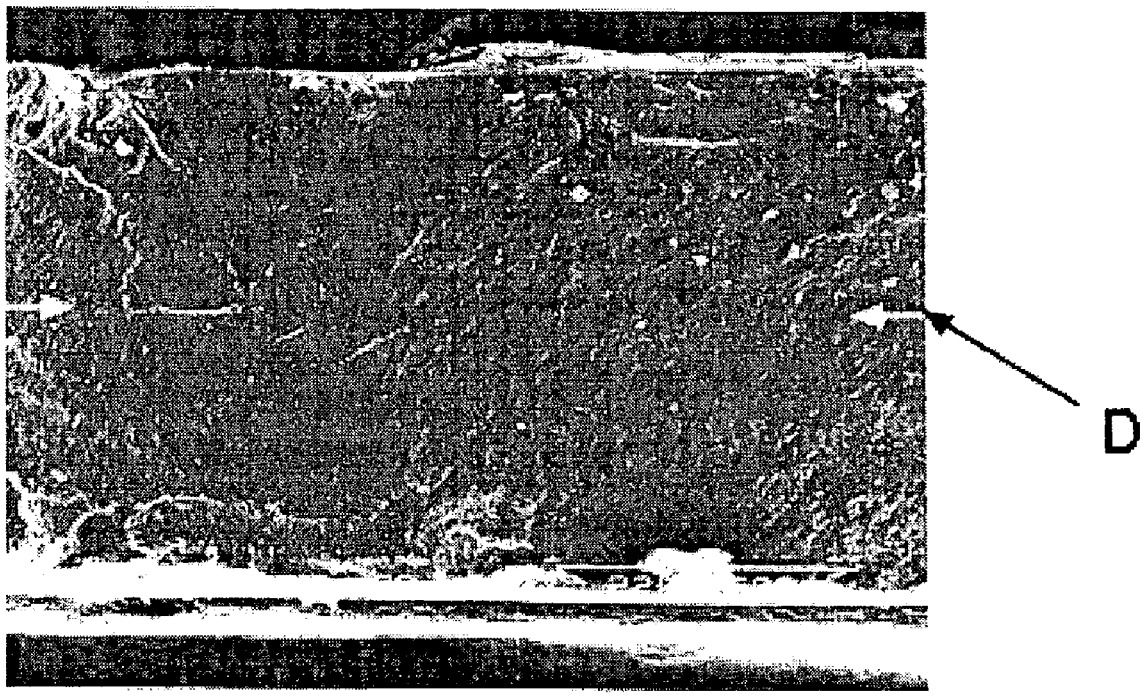
FIG. 5 is a cross-sectional view showing the fracture surface of a laminated body formed by laminating two tapes by the liquid condensation process.

FIG. 5 shows a section of the laminated body. It is noted that the two tapes are formed so integrated that the laminated face (D) can be hardly discriminating.

As so far described, in the present invention, in order to obtain a uniform shaped body regardless of the size, shape and distribution of the primary particle, while the uniform distribution of the constituent particle and constituent material in a required granule is maintained, the compaction characteristics of the granule can be controlled.

The liquid condensation method using the solubility difference between the solvent constituting the slurry and the solvent filling the dropped container has such advantages in controlling the physical property of the granule and the physical property of the shaped body in the following two aspects.

That is, one is obtaining of uniform granules regardless of the size of shape of the constituent powder particle, and the other is freely controlling a composition or a content of the binding agent in order to control the granule or the physical property of the shaped body.

As for a degree of freedom over the size or shape of particles of the constituent powders, granules with an excellent uniformity can be fabricated, which can be hardly obtained by the preparation process much affected by the capillary migration such as the thermal spray granules in forming granules such as the powder material with a wide grain-size distribution, the composite material containing the fibrous or platy particles having the geometric anisotropy in its shape or a composite material having a great density difference between constituent particles so that particles are easily separated.

In addition, the shaped body prepared by the dry press process and the tape casting has a completely different type of binding agent and content, and thus, it has much different thermal and mechanical physical property.

The droplet condensation method has such an advantage that since the composition and content of the binding agent can be freely controlled comparatively, a flexibility or lamination deformation amount such as the ceramic tape can be obtained from the shaped body prepared by the compression forming.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for preparing powder granules by a liquid condensation process, comprising:

preparing a slurry by mixing powders, a binding agent and a soluble solvent with solubility of the binding agent;

dropping the slurry to an insoluble solvent with substantially no solubility of the binding agent to fix the binding agent so that the binding agent does not substantially migrate to a surface of a droplet of the slurry, coagulating the droplet by solvent exchange between the soluble solvent inside the droplet and the insoluble solvent at the surface of the droplets; and separating the coagulated droplet from the insoluble solvent, drying it and removing a residual solvent, wherein the content of powders of the slurry is 1–5 vol. % of the slurry.

2. The method of claim 1 further comprising the step of agitating, milling or making an ultrasonic treatment of the slurry for a uniform mixture of the slurry.

3. The method of claim 1, wherein the slurry contains a dispersion agent or a plasticizer.

4. The method of claim 1, wherein the binding agent is a thermosetting resin, a thermoplastic resin or their mixture.

5. A method for shapining powder granules by a liquid condensation process comprising the steps of:

preparing a slurry by mixing powders to be shaped, a binding agent and a soluble solvent with solubility of the binding agent;

dropping the slurry to an insoluble solvent with substantially no solubility of the binding agent so that the binding agent does not substantially migrate to a surface of a droplet of the slurry, coagulating the droplet by solvent exchange between the soluble solvent inside the droplet and the insoluble solvent at the surface of the droplets of the dropped slurry;

separating the coagulated droplet from the insoluble solvent, drying it and completely removing a residual solvent;

pressurizing the dried granules in a metal mold to fabricate a shaped body; and removing the binding agent by heating the shaped body, wherein the binding agent includes a thermosetting resin and a thermoplastic resin.

6. The method of claim 5 wherein the thermoplastic resin is removed first by heating the shaped body, and then, the thermosetting resin is thermally decomposed and removed.

7. A method for preparing powder granules by a liquid condensation process, comprising:

preparing a slurry by mixing powders, a binding agent and a soluble solvent with solubility of the binding agent;

dropping the slurry to an insoluble solvent with substantially no solubility of the binding agent to fix the binding agent so that the binding agent does not substantially migrate to a surface of a droplet of the slurry, coagulating the droplet by solvent exchange between the soluble solvent inside the droplet and the insoluble solvent at the surface of the droplets; and separating the coagulated droplet from the insoluble solvent, drying it and removing a residual solvent, wherein the powders contains fibrous or platy geometric anisotropic particles, and the volume fraction of the powders in the slurry is 0.5–4%.

* * * * *